United States Patent
Raju et al.

(10) Patent No.: US 11,650,930 B2
(45) Date of Patent: May 16, 2023

(54) RECONFIGURABLE MEMORY MAPPED PERIPHERAL REGISTERS

(71) Applicant: TEXAS INSTRUMENTS INCORPORATED, Dallas, TX (US)

(72) Inventors: Veeramanikandan Raju, Bengaluru (IN); Anand Kumar G, Bengaluru (IN); Prachi Mishra, Ahmedabad (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/482,676

(22) Filed: Sep. 23, 2021

(65) Prior Publication Data

US 2023/0091498 A1 Mar. 23, 2023

(51) Int. Cl.
*G06F 13/10* (2006.01)
*G06F 12/10* (2016.01)

(52) U.S. Cl.
CPC ............ *G06F 12/10* (2013.01); *G06F 13/102* (2013.01); *G06F 2212/657* (2013.01)

(58) Field of Classification Search
CPC ... G06F 12/10; G06F 13/102; G06F 2212/657
USPC ....................................................... 711/203
See application file for complete search history.

(56) References Cited

U.S. PATENT DOCUMENTS

| | | | | |
|---|---|---|---|---|
| 7,009,618 B1* | 3/2006 | Brunner | ................ | G06F 12/063 345/557 |
| 7,849,287 B2* | 12/2010 | Hummel | ............. | G06F 12/1081 710/26 |
| 8,134,568 B1* | 3/2012 | Iwamoto | ................... | G06F 3/14 345/568 |
| 2008/0114906 A1* | 5/2008 | Hummel | ............. | G06F 12/0284 710/22 |
| 2012/0166687 A1* | 6/2012 | Baker | ................... | G06F 13/105 710/49 |
| 2016/0085684 A1* | 3/2016 | Borikar | ................. | G06F 12/109 711/209 |
| 2019/0294339 A1* | 9/2019 | Bolkhovitin | .......... | G06F 3/0688 |
| 2021/0334213 A1* | 10/2021 | Dorris | ..................... | G06F 9/467 |

* cited by examiner

*Primary Examiner* — Christopher B Shin
(74) *Attorney, Agent, or Firm* — Michael T. Gabrik; Frank D. Cimino (57) ABSTRACT

A computing device, including a processor; a memory, wherein the memory is accessible for memory operations via a range of logical memory addresses; a peripheral interface including a first control register; and a peripheral address remapping module configured to determine that the peripheral interface is unused for interfacing with a peripheral; determine a first memory address for accessing the first control register; determine a first logical memory address, the first logical memory address outside of the range of logical memory addresses for accessing the memory; and map the first logical memory address to the first memory address, wherein the first control register is accessible for memory operations using the first logical memory address.

20 Claims, 4 Drawing Sheets

RECONFIGURABLE MEMORY MAPPED PERIPHERAL REGISTERS

BACKGROUND

Microcontrollers are often used to automate and/or control many products or devices in use today and can be found in a wide variety of devices, from automobile control systems to toys. Typically, a microcontroller is a miniature computing system that includes one or more processors, memory, and one or more peripheral input/outputs (i/Os) for controlling peripherals that are coupled to the microcontroller. These microcontrollers may be obtained by device manufacturers and programmed by the manufacturers to perform specific tasks for the devices in which the microcontroller is to be embedded. This programming may be performed, for example, by flashing a firmware to the microcontroller, loading software from the microcontroller memory, etc. Often, microcontrollers are designed and built in an application agnostic fashion, and such microcontrollers may be initially designed with a range of capabilities. In some cases, not all of these capabilities may be utilized by the device manufacturers.

SUMMARY

This disclosure relates to techniques for a computing device that includes a processor and a memory, wherein the memory is accessible for memory operations via a range of logical memory addresses. The computing device further includes a peripheral interface that includes a first control register. The computing device further includes a peripheral address remapping module configured to determine that the peripheral interface is unused for interfacing with a peripheral. The peripheral address remapping module is further configured to determine a first memory address for accessing the first control register. The peripheral address remapping module is also configured to determine a first logical memory address, the first logical memory address outside of the range of logical memory addresses for accessing the memory. The peripheral address remapping module is further configured to map the first logical memory address to the first memory address, wherein the first control register is accessible for memory operations using the first logical memory address.

Another aspect of the present disclosure includes a method. The method includes receiving a request to access a logical memory address. The method also includes determining that the logical memory address is outside a range of logical memory addresses associated with a memory. The method further includes determining the logical memory address to a first memory address for a first control register of a peripheral interface, the peripheral interface unused for interfacing with a peripheral. The method also includes accessing the first control register based on the request to access.

Another aspect of the present disclosure includes a circuit that includes a processor and a memory, wherein the memory is accessible for memory operations via a range of logical memory addresses. The circuit also includes a peripheral interface that includes a first control register. The circuit further includes a peripheral address remapping module configured to determine that the peripheral interface is unused for interfacing with a peripheral. The peripheral address remapping module is also configured to determine a first memory address for accessing the first control register. The peripheral address remapping module is further configured to determine a first logical memory address, the first logical memory address outside of the range of logical memory addresses for accessing the memory. The peripheral address remapping module is also configured to map the first logical memory address to the first memory address, wherein the first control register is accessible for memory operations using the first logical memory address.

BRIEF DESCRIPTION OF THE DRAWINGS

For a detailed description of various examples, reference will now be made to the accompanying drawings in which.

DETAILED DESCRIPTION

Often, microcontrollers are designed with a plurality of peripheral interfaces, which device manufactures may utilize. These peripherals may provide connectivity, services, and/or interfaces for a processor of the microcontroller. Examples of peripherals include, but are not limited to, various sensors, timers, event counters, pulse width modulation (PWM) generators, interface buses, such as universal serial bus (USB), multimedia card (MMC), etc. Often microcontrollers are designed to target a broad range of applications while balancing factors such as microcontroller chip size, and hence cost, while enabling broad and flexible support for different peripherals that device manufactures may want to couple to the microcontroller. Thus, an amount of memory available on the microcontroller may be relatively limited, while some peripheral interfaces may go unused. When such a peripheral is not used, registers associated with the peripheral, such as control and/or configuration registers (hereinafter referred to as "control registers") for the peripheral may go unused. It may be beneficial to reuse these registers associated with unused peripherals to supplement the memory of the microcontroller.

Figure 1:
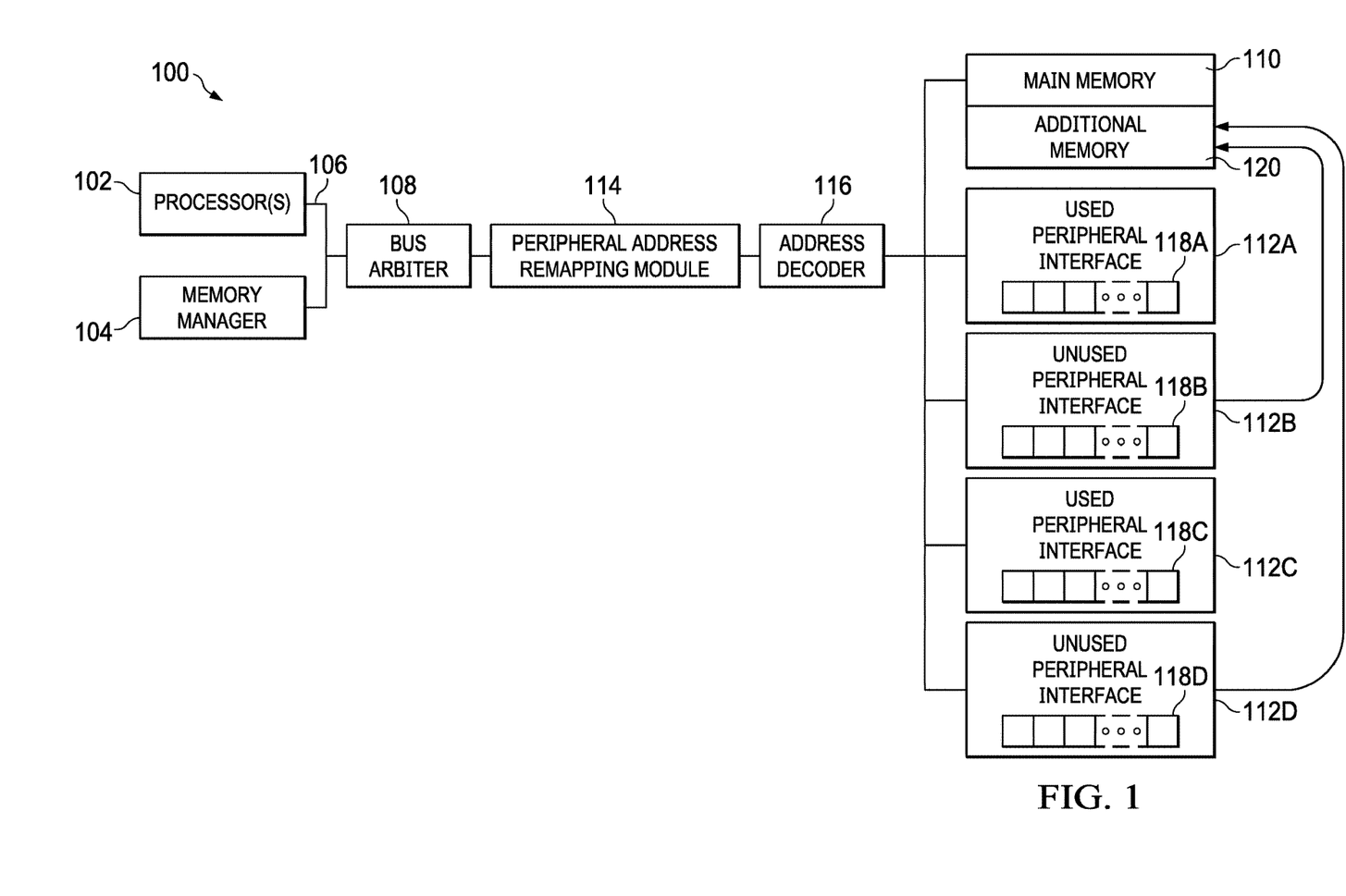
FIG. 1 is an architectural overview of a computing system having reconfigurable memory mapped peripheral registers, in accordance with aspects of the present disclosure.

FIG. 1 is an architectural overview of a computing system 100 having reconfigurable memory mapped peripheral registers, in accordance with aspects of the present disclosure. In some cases, the computing system 100 may be a microcontroller. As shown, the computing system 100 includes one or more processors 102 and a memory manager 104. The processor(s) 102 and memory manager 104 may be bus master devices which can initiate memory requests on a memory bus 106. The processor(s) 102 and memory manager 104 may be coupled, via the memory bus 106, to a bus arbiter 108, which helps control access to a main memory 110 and peripheral interfaces 112A-112D (collectively 112). The bus arbiter 108 is coupled to a peripheral address remapping module (PARM) 114, which tracks unused peripheral registers and helps remap memory addresses to these peripheral registers. The bus arbiter 108 is coupled to an address decoder 116 which may perform base address decoding. The address decoder 116 is coupled to the main memory 110 and peripheral interfaces 112.

The peripheral interfaces 112 may include a set of control registers 118A-118D (collectively 118) associated with the peripheral interfaces 112. The set of control registers 118 may be one or more read/write registers provided to control and/or configure a peripheral attached to a respective peripheral interface 112. For example, during operation of a peripheral interface, control information may be written to one or more control registers 118 of the peripheral interface 112. The control information may then be transmitted to the respective peripheral 122, where the control information may be used to adjust the operation of the peripheral 122. The control registers 118 may be memory-mapped registers. For example, the processor 102 may be able to write control information to a one or more control registers 118 of a peripheral interface 112 by writing to a certain mapped memory address. In some cases, a size of the control registers 118 may vary between different peripheral interfaces 112.

In some cases, the computing system 100 may be configured to use less than all of the peripherals of the system. For example, an off-the-shelf microcontroller may be designed to support a wide variety of peripherals users may want to use. Users of the microcontroller may choose to use the microcontroller for a variety of reasons, such as processor speed, memory bandwidth, price/performance ratio, etc., and may not need to use all of the peripheral interfaces available on the microcontroller. In such cases, certain peripheral interfaces may go unused. For example, the microcontroller may be configured to support five sensor and actuator peripheral interfaces. A user may configure the microcontroller to interface with a single sensor to detect certain conditions and then control an actuator if the conditions occur. The microcontroller thus uses two of the sensor and actuator peripheral interfaces while three peripheral interfaces go unused. In this example, the used peripheral interfaces include peripheral interfaces 112A and 112C, while peripheral interfaces 112B and 112D are unused.

In some cases, unused peripheral interfaces 112B and 112D include control registers 118B and 118D which are also unused to control peripherals. In accordance with aspects of the present disclosure, unused control registers, such as control registers 118B and 118D, may be used as additional memory 120 to augment the main memory 110. In some cases, the PARM 114 may track unused peripherals and map the unused control registers for use as additional memory 120.

Figure 2:
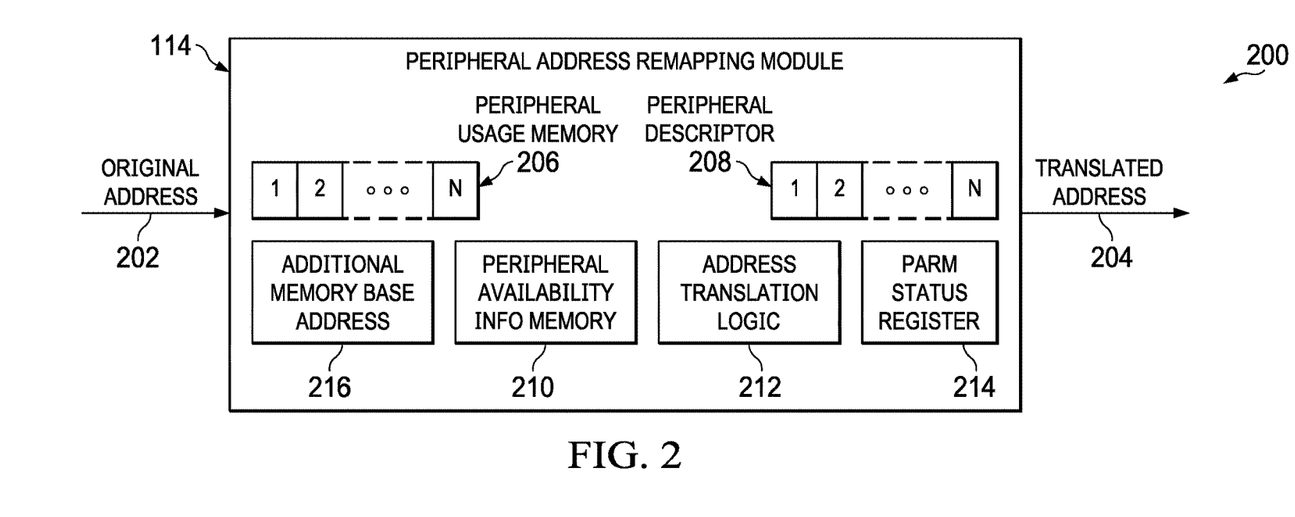
FIG. 2 is a block diagram illustrating components of a peripheral address remapping module (PARM), in accordance with aspects of the present disclosure.

FIG. 2 is a block diagram 200 illustrating components of a PARM 114, in accordance with aspects of the present disclosure. As shown, the PARM 114 includes a peripheral usage memory 206, a peripheral descriptor memory 208, peripheral availability information memory 210, address translation logic 212, a PARM status register 214, and an additional memory base address memory 216. The PARM 114 may receive, as input, logical original memory addresses 202, and the PARM 114 may output translated memory addresses 204. The additional memory base address memory 216 may be any kind of memory, such as static random access memory (SRAM), a set of registers, etc., configured to store a memory address at which a set of additional memory that includes control registers of unused peripheral interfaces begins. In some cases, the additional memory may be configured to be contiguous with the main memory, and the additional memory base address 216 may be a memory address that is directly after the last memory address of the main memory. For example, if memory addresses of the main memory run from 0, 1, . . . Y, then the additional base memory address 216 may have a value of Y+1.

The peripheral usage memory 206 may be used to track which peripheral interfaces are used and which peripheral interfaces are not used (i.e., peripheral interfaces that are not used for interfacing with a peripheral). The peripheral usage memory 206 may be any kind of memory, such as SRAM, a set of registers, etc. In some cases, a size of the peripheral usage memory 206 may be based on a number of peripheral interfaces available to the computing system. For example, the size of the peripheral usage memory 206, in bits (numbered from 1, 2, . . . N), may match the number of peripheral interfaces available (e.g., both used and unused). Thus, if there are N peripheral interfaces, the peripheral usage memory 206 may be N bits in size, where each bit represents a corresponding peripheral interface. In some cases, each bit of the peripheral usage memory 206 may be mapped to a specific peripheral interface. In such cases, a certain value stored in the peripheral usage memory 206 may indicate that the mapped peripheral interface is used, and another value may indicate that the mapped peripheral interface is not used. For example, when a bit is set to 1 in the peripheral usage memory 206, then the corresponding peripheral interface is not used, while a bit value of 0 indicates that the corresponding peripheral interface is used.

A computing system, such as a microcontroller, may be designed as a generic computing system with a number of available peripheral interfaces. In some cases, a number of enabled peripheral interfaces may vary for implementation of the computing system. For example, different versions of this generic computing system may be offered. As a first example, a version of the generic computing system may be offered with less than all of the peripheral interfaces enabled. Certain peripheral interfaces, and corresponding control registers, may be disabled, for example, during manufacturing of the computing system or via software, such as a firmware executing on the computing system. In such cases, the control registers may still be on the physical chip and while the peripheral interface may be disabled for use with a peripheral, the control registers of the peripheral interface may still be accessible and access to the control registers may be made available. In such cases, the control registers associated with the disabled peripheral interfaces may be made available for use as additional memory, in part, by the PARM 114. For example, an indication of the peripheral interfaces that are disabled may be stored in the peripheral availability information memory 210. In some cases, the peripheral availability information memory 210 may be a non-transitory memory storage, such as a read-only memory (ROM), flash memory, or other non-transitory memory. The indication of the peripheral interfaces that are disabled may be stored in the peripheral availability information memory 210, for example, as a part of producing and/or configuring of the computing system by the manufacturer of the computing system. In some cases, the indication of the peripheral interfaces that are disabled may be loaded into the peripheral usage memory 206 during a boot process for the computing system.

As a second example, a user, such as the device manufacturer that includes (e.g., embeds) the computing system, may configure the computing system to use a number of peripheral interfaces which is less than all of the peripheral interfaces enabled on the computing system. For example, the manufacturer of the device into which the computing system may be embedded in, may directly configure (either statically (e.g., one time) or dynamically) which peripheral interfaces are enabled or disabled, for example, at runtime by programmatically writing values to the peripheral usage memory 206. Thus, the peripheral usage memory 206 may track peripheral interfaces which could be used, for example by the device manufacturer, but are not used, while the peripheral availability information memory 210 tracks which peripheral interfaces cannot be used, for example by the device manufacture, for controlling a peripheral.

The peripheral descriptor memory 208 may be any kind of memory, such as SRAM, a set of registers, ROM, etc. The peripheral descriptor memory 208 may include information about the peripheral control registers. For example, the peripheral descriptor memory 208 may include, for each peripheral interface, a base memory address for the set of peripheral control registers associated with a given peripheral interface, a number of full word registers, half-word registers, and byte registers associated with the given peripheral interface, along with memory addresses and/or memory address offsets associated with the full word registers, half-word registers, and byte registers. In some cases, memory, such as a main memory of the computing device, may be organized such that a full memory word represents a largest amount of data that can be written to the memory in a single operation. For example, a computing system may use 32-bit memory words and thus a full word register would have a size of 32 bits, while a half-word register would have a size of 16 bits, and a byte register would have a size of 1 byte (e.g., 8 bits).

The address translation logic 212 includes logic to map a logical memory address to memory addresses of the additional memory. For example, the address translation logic 212 may determine which peripheral interfaces are unused based on information in the peripheral usage memory 206 and determine an amount of additional memory available, and peripheral interface register addresses for the additional memory, based on information in the peripheral descriptor memory 208 for the peripheral interfaces that are unused. In some cases, information about the amount of additional memory available may be stored in the PARM status register 214. Consecutive logical memory address may then be mapped to the determined amount of memory using the peripheral interface register memory addresses. For example, the logical memory addresses may start from the additional memory base address 216 and may be mapped to the peripheral interface register addresses of the control registers on the unused peripheral interfaces. Where a computing system supports dynamically configuring which peripheral interfaces are enabled or disabled at runtime, the address translation logic may redetermine the logical memory address mapping when peripheral interfaces are enabled or disabled.

Figure 3:
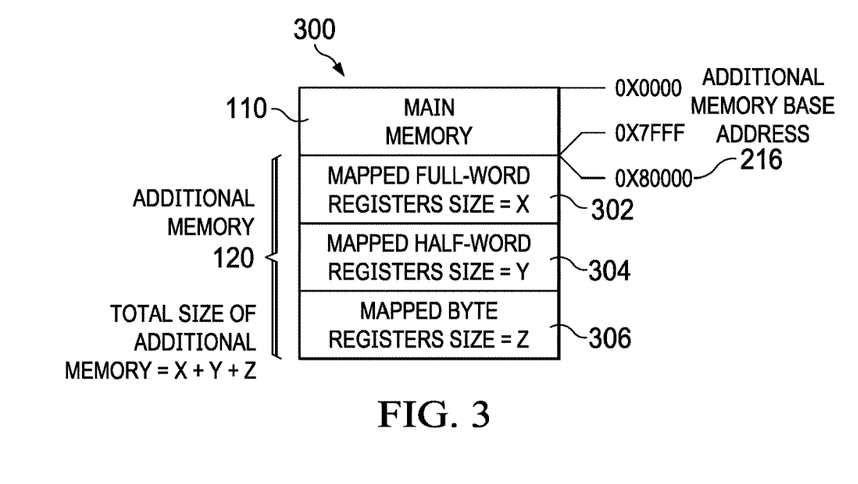
FIG. 3 is a conceptual diagram illustrating logical memory addresses of the main memory and additional memory, in accordance to aspects of the present disclosure.

FIG. 3 is a conceptual diagram 300 illustrating logical memory addresses of the main memory 110 and additional memory 120, in accordance to aspects of the present disclosure. In this example, the main memory includes logical memory addresses from 0x0000 to 0x7FFF. Here, the additional memory base address 216 is 0x8000, and the additional memory 120 may be logically addressed starting from 0x8000. In some cases, the mapping of the control registers 118 may be arranged, for the additional memory 120, based on the size of the control registers 118. For example, full word registers of the unused peripheral interfaces 112 may be logically mapped to a first portion 302 of the additional memory 120 that consecutively follows the main memory 110. In this example, the first portion 302 may be logically addressed starting from 0x8000. A total size, here X, of the first portion 302 may be based on a number of full-word registers in the unused peripheral interfaces 112. In this example, the logical memory addresses of the first portion may run from 0x8000 to 0x8000+X.

Similarly, the half-word registers of the unused peripheral interfaces 112 may be logically mapped to a second portion 304 of the additional memory 120 that consecutively follows the first portion 302. A total size, here Y, of the second portion 304 may be based on a number of half-word registers in the unused peripheral interfaces 112. Thus, in this example, the second portion 304 may be logically addressed starting from 0x8000+(X+1) and running through 0x8000+X+Y. The byte registers of the unused peripheral interfaces 112 may be logically mapped to a third portion 306 of the additional memory 120 that consecutively follows the second portion 304. A total size, here Z, of the third portion 306 may be based on a number of byte registers in the unused peripheral interfaces 112. Thus, in this example the third portion 306 may be logically addressed starting from 0x8000+X+(Y+1) and running through 0x8000+X+Y+Z. The total size of the additional memory 120 then is X+Y+Z. Information about the size of the first portion 302, second portion 304, and third portion 306, and hence total size of the additional memory 120 may be stored in the PARM status register 214.

Figure 4:
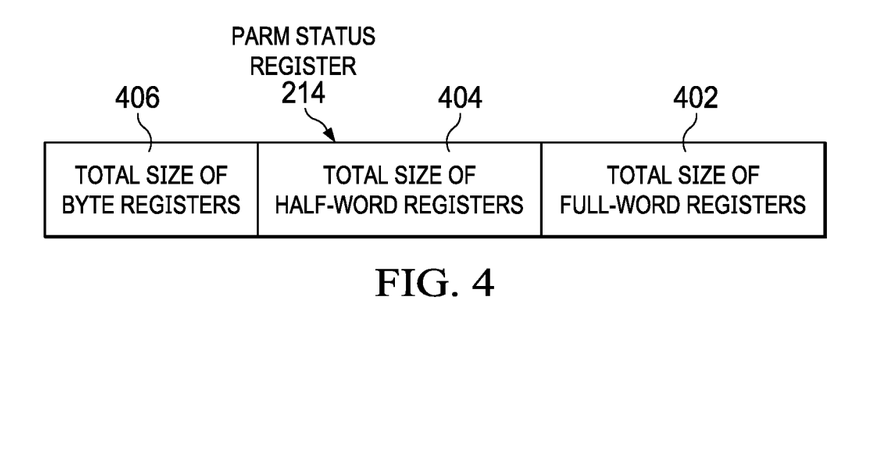
FIG. 4 is a conceptual diagram of the PARM status register, in accordance with aspects of the present disclosure.

FIG. 4 is a conceptual diagram of the PARM status register 214, in accordance with aspects of the present disclosure. As shown, a total size of the full-word registers 402 (i.e., X) of the unused peripheral interfaces 112 may be stored in the PARM status register 214. In some cases, the total size of the full-word registers 402 of the unused peripheral interfaces 112 may be determined based on information from the peripheral usage memory 206 and peripheral descriptor 208. For example, address translation logic 212 may read the peripheral usage memory 206 and peripheral availability information memory 210 to determine the peripheral interfaces which are not being used. The address translation logic 212 may then access the peripheral descriptor memory 208 based on the determined unused peripheral interfaces to determine a number of full-word registers that each unused peripheral interface includes. The total size of the full-word registers 402 may be determined by summing the number of full-word registers of the unused peripheral interfaces. A total size of the half-word registers 404 and a total size of the byte registers 406 may be similarly determined. In some cases, the total size of the full-word registers 402, half-word registers 404, and/or byte registers may be output, for example, based on a request received from the processor 102.

Figure 5:
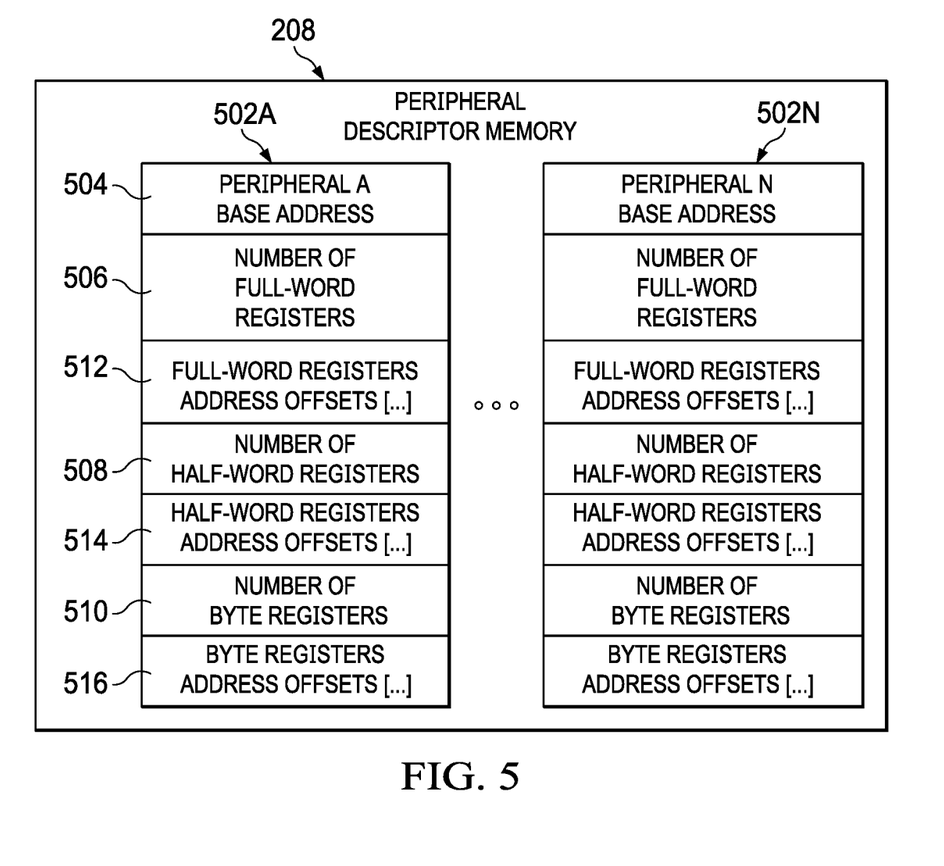
FIG. 5 is a conceptual diagram of the peripheral descriptor memory, in accordance with aspects of the present disclosure.

FIG. 5 is a conceptual diagram of the peripheral descriptor memory 208, in accordance with aspects of the present disclosure. In some cases, the peripheral descriptor memory 208 may include a descriptor data structure 502A . . . 502N (collectively 502) for each peripheral interface 112 describing the control registers 118 of the peripheral interface 112. For example, where there are N peripheral interfaces, there may be N corresponding descriptor data structures 502. As shown, each descriptor data structure 502 may include information such as a base memory address 504 for the control registers 118 of the corresponding peripheral interface 112.

In some cases, peripheral interfaces may have any number of control registers. For example, control registers 118A of peripheral interface may include two full-word registers, one half-word register, and no byte registers. Thus, the descriptor data structure 502 may also include an indication of a number of full-word registers 506, half-word registers 508, and byte registers 510 that are found in the control registers 118 of the corresponding peripheral interface 112. Returning to the example, the number of full-word registers 506 may have a value of two, the indication of the number of half-word registers 508 may have a value of one, and the indication of the byte registers 510 may have a value of zero. To help determine memory addresses for the different registers of the control registers 118 for a given peripheral interface 112, the descriptor data structure 502 may also include an indication of memory address offsets for each of the full-word registers 512, memory address offsets for each of the half-word registers 514, and memory address offsets for each of the byte registers 516.

In some cases, the peripheral descriptor memory 208 may be preconfigured with information related to the control registers 118 of the peripheral interfaces 112. For example, the information may be stored into the peripheral descriptor memory 208 as a part of producing and/or configuring of the computing system by the manufacturer of the computing system. In other cases, information related to the control registers 118 of the peripheral interfaces 112 may be loaded into the peripheral descriptor memory 208, for example, during a boot process for the computing system. In some cases, the information related to the control registers 118 of the peripheral interfaces 112 to be stored or already in the peripheral descriptor memory 208 may be modified, for example, during a configuration process. In some cases, the configuration process may be performed by the manufacturer of the computing system, and the information stored in the peripheral descriptor memory 208 may not be user configurable.

Figure 6:
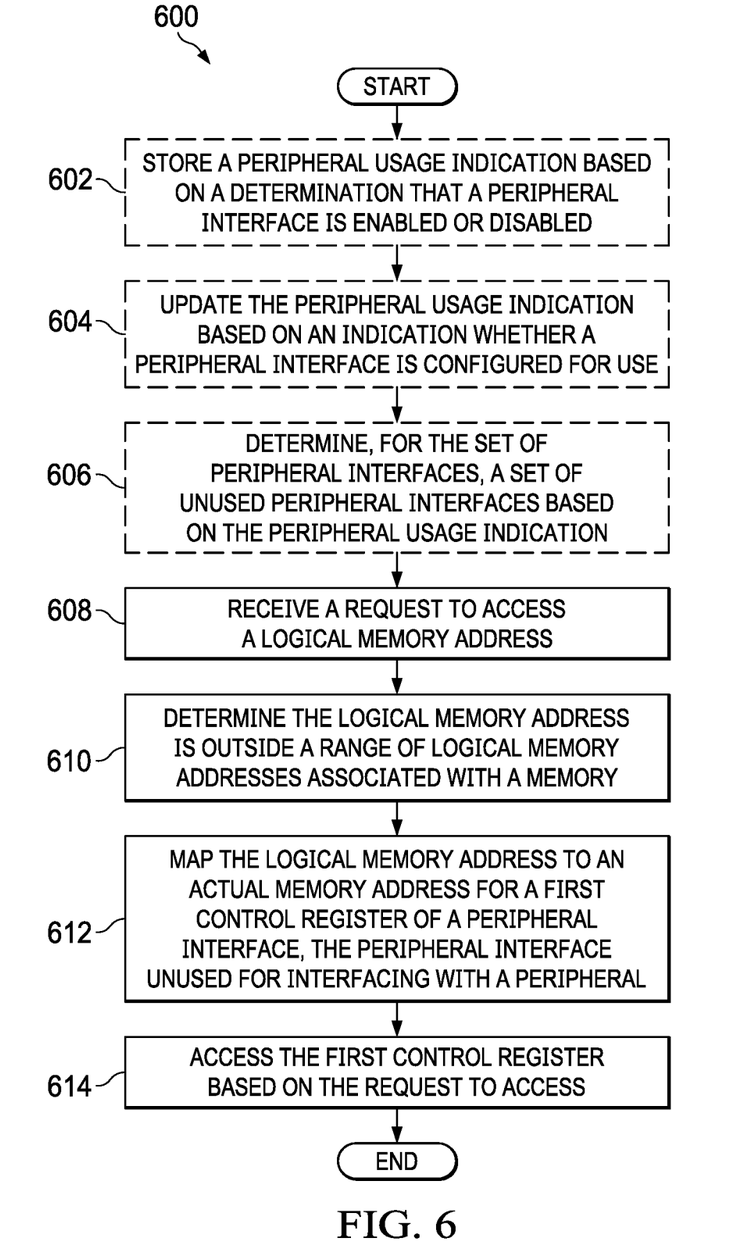
FIG. 6 is a flow diagram illustrating a technique for a reconfiguring a memory mapped peripheral register as memory, in accordance with aspects of the present disclosure.

FIG. 6 is a flow diagram 600 illustrating a technique for a reconfiguring a memory-mapped peripheral register as memory, in accordance with aspects of the present disclosure. As an example, a computing device, such as an embedded device, may be configured to execute software stored in a memory on a processor. The computing device includes a set of one or more peripheral interfaces for interfacing with peripherals. These peripheral interfaces each include one or more control registers, which may be used to control peripherals which can be coupled to the peripheral interface. Of the set of peripheral interfaces, at least one of the peripheral interfaces are not used to access a peripheral. At step 602, the computing device may store a peripheral usage indication based on a determination that a peripheral interface is enabled or disabled. For example, while the computing system may be manufactured with a set of peripheral interfaces, some of the peripheral interfaces may be disabled for use with a peripheral. An indication of the peripheral interfaces which are enabled and/or disabled may be stored, for example, in the peripheral availability information memory and this indication may be stored as a part of manufacturing the computing system. In some cases, during a boot process of the computing system, the peripheral availability information memory may be accessed and a memory, such as a peripheral usage memory, may be updated based on the indication of the enabled/disabled peripheral interfaces. At step 604, the computing system may update the peripheral usage indication based on an indication whether a peripheral interface is configured for use. For example, peripheral interfaces may be disabled and/or enabled programmatically and as a part of enabling or disabling the peripheral interface, the peripheral usage memory may be updated to indicate whether a peripheral interface is enabled or disabled. At step 606, the computing device may determine, for the set of peripheral interfaces, a set of unused peripheral interfaces based on the peripheral usage indication. For example, the computing device may include a peripheral usage memory tracking which peripheral interfaces are used. This peripheral usage memory may be preconfigured, for example at manufacturing time, updated on boot, and/or programmatically updated. The computing device may access the peripheral usage memory to determine which peripheral interfaces are in use and which are not used. The computing device may determine, for the unused control registers, a size for each of the unused control registers. For example, the computing device may include a peripheral descriptor memory storing an information related to the control registers of the set of peripheral interfaces. The computing system may generate groupings for the unused control registers based on the size of each unused control register. For example, the control registers may be grouped based on whether the control registers are full-word registers, half-word registers, or byte registers. The computing system may also determine a size of one or more groups of unused control registers. For example, the computing system may determine a size of the groups of full-word registers, half-word registers, or byte registers, along with a total size of the unused control registers. These sizes may be output, for example, based on a request by software executing on the processor.

At block 608, a request is received to access (e.g., read, write, or otherwise utilize memory at) a logical memory address. For example, software executing on the processor may send a request to access a logical memory address which is mapped to a control register of an unused peripheral interface. At block 610, the logical memory address is determined to be outside a range of logical memory addresses associated with a memory. For example, the logical memory address may be compared to a base memory address for the additional memory.

At block 612, the logical memory address is mapped to a memory address for a first control register of a peripheral interface, the peripheral interface unused for interfacing with a peripheral. In some cases, the logical memory addresses of the unused control registers (e.g., additional memory) may be contiguous with the logical memory addresses of the memory. At block 614, the first control register is accessed based on the request to access. In some cases, the technique for a reconfiguring a memory-mapped peripheral register as memory may be performed by a processing circuit based on instructions read from a non-transitory memory.

In this description, the term "couple" may include connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. A computing device, including:
   a processor;
   a memory, wherein the memory is accessible for memory operations via a range of logical memory addresses;
   a peripheral interface including a first control register, wherein the first control register includes a first actual memory address; and
   a peripheral address mapping module configured to:
      map the range of logical memory addresses to the memory;
      determine that the peripheral interface is not being used for interfacing with a peripheral;
      determine that a first logical memory address is not within the range of logical memory addresses; and map the first logical memory address to the first actual memory address of the first control register in response to determining that the peripheral interface is not being used for interfacing with the peripheral.

2. The computing device of claim 1, wherein the peripheral address mapping module is further configured to:
receive a request to access the first logical memory address;
determine that the first logical memory address is not within the range of logical memory addresses;
determine that the first logical memory address maps to the first control register; and
access the first control register in response to the request to access.

3. The computing device of claim 1, wherein the computing device further includes a peripheral availability information memory configured to store an indication that the peripheral interface is not being used.

4. The computing device of claim 3, wherein the peripheral availability information memory is preconfigured with the indication that the peripheral interface is not being used.

5. The computing device of claim 3,
wherein the computing device further includes a peripheral usage memory configured to store an indication that the peripheral interface is not being used, and
wherein the peripheral address mapping module is configured to:
receive, from the processor, an indication that the peripheral interface is disabled; and
cause the peripheral usage memory to store the indication that the peripheral interface is in response to receiving the indication that the peripheral interface is disabled.

6. The computing device of claim 5, wherein the peripheral usage memory is further configured to:
receive, from the processor, an indication that the peripheral interface is enabled; and
responsive to receiving the indication that the peripheral interface is enabled, remove the mapping of the first logical memory address to the first actual memory address.

7. The computing device of claim 1, wherein the first logical memory address is contiguous with the range of logical memory addresses.

8. The computing device of claim 7,
wherein the peripheral interface includes a second control register; and
wherein the peripheral address mapping module is further configured to:
determine a second actual memory address for accessing the second control register;
determine a size of the second control register;
determine a second logical memory address, the second logical memory address after the first logical memory address; and
map the second logical memory address to the second actual memory address based on the size of the second control register.

9. The computing device of claim 1, wherein the computing device further includes a peripheral descriptor memory configured to:
store an indication of a base memory address for control registers of the peripheral interface;
store an indication of a memory offset for control registers of the peripheral interface; and
wherein peripheral address mapping module is further configured to map the first logical memory address to the first actual memory address based on the stored indication of the base memory address and the stored indication of the memory offset.

10. The computing device of claim 1, wherein the computing device further includes a peripheral descriptor memory configured to store an indication of a size of control registers of the peripheral interface.

11. The computing device of claim 10, wherein the peripheral descriptor memory is preconfigured.

12. A method comprising:
receiving, by a peripheral interface mapping module of a computing device from a processor or from a memory manager, a request to access a logical memory address;
determining, by the peripheral interface mapping module, that the logical memory address is not within a range of logical memory addresses, wherein the range of logical memory addresses maps to a memory in the computing device;
determining, by the peripheral interface mapping module, that a peripheral interface in the computing device is not being used for interfacing with a peripheral, wherein the peripheral interface includes a first control register including a first actual memory address;
mapping, by the peripheral interface mapping module, the logical memory address to flail the first actual memory address of the first control register in response to determining that the peripheral interface is not being used for interfacing with the peripheral; and
accessing, by the peripheral interface mapping module, the first control register in response to the request to access after the logical memory address has been mapped to the first actual memory address.

13. The method of claim 12, wherein mapping the logical memory address to the first actual memory address is based on an indication of a base memory address and an indication of a memory offset.

14. The method of claim 12, further comprising:
determining, for a set of peripheral interfaces, a set of unused peripheral interfaces of the set of peripheral interfaces;
determining, for unused control registers of peripheral interfaces in the set of unused peripheral interfaces, a size for each of the unused control registers;
generating groupings for the unused control registers based on the size of each unused control register;
determine a size of a group of unused control registers of the groupings of the unused control registers; and
outputting the size of the group of unused control registers.

15. The method of claim 14, further comprising:
determining an additional memory size based on the size of each unused control register; and
outputting the additional memory size.

16. The computing device of claim 1,
wherein the peripheral interface further includes full word registers and half word registers, and
wherein the peripheral address mapping module is configured to, responsive to determining that the peripheral interface is not being used for interfacing with the peripheral:
logically map the full word registers to a first portion of additional memory that is not within the range of logical memory addresses; and
logically map the half word registers to a second portion of additional memory that is not within the range of logical memory addresses.

17. The computing device of claim 16, wherein the computing device further includes a peripheral descriptor memory configured to:
store a base memory address for the full word registers; and store a memory offset for the half word registers,
wherein peripheral address mapping module is further configured to map the first logical memory address to the first actual memory address based on the base memory address.

18. The method of claim 12, further comprising:
receiving an indication that the peripheral interface is enabled; and
responsive to receiving the indication that the peripheral interface is enabled, removing the mapping of the logical memory address to the first actual memory address.

19. The method of claim 12,
wherein the peripheral interface further includes full word registers and half word registers, and
wherein the method further comprises, responsive to determining that the peripheral interface is not being used for interfacing with the peripheral:
  logically map the full word registers to a first portion of additional memory that is not within the range of logical memory addresses; and
  logically map the half word registers to a second portion of additional memory that is not within the range of logical memory addresses.

20. A device comprising:
a main memory;
a peripheral interface comprising a first register including a first physical address;
a peripheral usage memory configured to store an indication that the first register is available to be mapped as additional memory; and
an address mapping module configured to:
  map a range of logical addresses to the main memory;
  receive a request to access a first logical address;
  after receiving the request, determine that the first logical address is not within the range of logical addresses mapped to the main memory;
  read the indication stored in the peripheral usage memory;
  map a first logical address to the first physical address in response to the indication stored in the peripheral usage memory;
  determine that the indication stored in the peripheral usage memory has changed to indicate that the peripheral interface has been enabled; and
  responsive to the indication that the peripheral interface has been enabled, remove the mapping of the first logical address to the first physical address.

\* \* \* \* \*